United States Patent
Gomi (10) Patent No.: US 7,854,472 B2
(45) Date of Patent: Dec. 21, 2010

(54) VEHICLE BODY STRUCTURE

(75) Inventor: Tetsuya Gomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 187 days.

(21) Appl. No.: 12/254,198

(22) Filed: Oct. 20, 2008

(65) Prior Publication Data
US 2009/0102238 A1 Apr. 23, 2009

(30) Foreign Application Priority Data
Oct. 22, 2007 (JP) ............................. 2007-273837
Oct. 22, 2007 (JP) ............................. 2007-273876

(51) Int. Cl.
*B62D 25/20* (2006.01)
(52) U.S. Cl. .................... 296/193.07; 296/30; 403/174; 403/178
(58) Field of Classification Search ................ 29/897.2; 52/633, 653.1; 296/29, 30, 187.08, 193.07, 296/204; 403/169, 170, 174, 178, 345
See application file for complete search history.

(56) References Cited

U.S. PATENT DOCUMENTS

| | | | | |
|---|---|---|---|---|
| 1,854,710 | A * | 4/1932 | Mayer | 280/784 |
| 2,657,645 | A * | 11/1953 | Ecoff | 105/401 |
| 3,328,935 | A * | 7/1967 | Peras | 52/630 |
| 4,402,545 | A * | 9/1983 | Utsunomiya et al. | 296/204 |
| 4,462,629 | A * | 7/1984 | Todori et al. | 296/30 |
| 4,865,378 | A * | 9/1989 | Filtri et al. | 296/193.07 |
| 4,973,103 | A * | 11/1990 | Imajyo et al. | 296/203.04 |
| 5,349,800 | A * | 9/1994 | Peng | 52/506.06 |
| 5,499,883 | A * | 3/1996 | Heinzel | 403/219 |
| 5,806,918 | A * | 9/1998 | Kanazawa | 296/204 |
| 5,992,921 | A * | 11/1999 | Seki | 296/187.09 |
| 6,293,617 | B1 * | 9/2001 | Sukegawa | 296/203.03 |
| 6,540,286 | B2 * | 4/2003 | Takemoto et al. | 296/204 |
| 6,616,217 | B1 * | 9/2003 | Robinson | 296/178 |
| 6,648,401 | B2 * | 11/2003 | Behnke et al. | 296/198 |
| 6,834,912 | B2 * | 12/2004 | Cardimen et al. | 296/204 |
| 6,957,845 | B2 * | 10/2005 | Rager | 296/146.9 |
| 7,014,256 | B2 * | 3/2006 | Kamura et al. | 296/193.07 |
| 7,500,714 | B2 * | 3/2009 | Abe et al. | 296/193.07 |
| 7,644,978 | B2 * | 1/2010 | Tosaka et al. | 296/187.12 |
| 7,690,721 | B2 * | 4/2010 | Grüneklee et al. | 296/203.01 |
| 7,716,835 | B2 * | 5/2010 | Johnson et al. | 29/897.2 |
| 2002/0050064 | A1 * | 5/2002 | Furuse et al. | 29/897.2 |
| 2009/0108633 | A1 * | 4/2009 | Ohi et al. | 296/204 |
| 2010/0078966 | A1 * | 4/2010 | Onoda et al. | 296/193.07 |

FOREIGN PATENT DOCUMENTS

JP 02232437 A * 9/1990

(Continued)

*Primary Examiner*—Glenn Dayoan
*Assistant Examiner*—Paul A Chenevert
(74) *Attorney, Agent, or Firm*—Rankin, Hill & Clark LLP (57) ABSTRACT

A vehicle body structure in which a panel is reinforced by a pair of reinforcing members, and a connecting member is included. The pair of reinforcing members intersects with each other and the reinforcing members are provided along one surface of the panel. The connecting member is connected to both of the pair of reinforcing members in a portion where the pair of reinforcing members intersects with each other.

4 Claims, 10 Drawing Sheets

FOREIGN PATENT DOCUMENTS

| | | | | |
|---|---|---|---|---|
| JP | 04087888 A | * | 3/1992 |
| JP | 05085422 A | * | 4/1993 |
| JP | 05221342 A | * | 8/1993 |
| JP | 05319304 A | * | 12/1993 |
| JP | 06016153 A | * | 1/1994 |
| JP | 06211167 A | * | 8/1994 |
| JP | 07-291150 | | 11/1995 |

* cited by examiner

VEHICLE BODY STRUCTURE

FIELD OF THE INVENTION

The present invention relates to a structure of a vehicle body in a passenger vehicle or another vehicle.

BACKGROUND OF THE INVENTION

Japanese Patent Application Laid-Open Publication No. 07-291150 (JP 07-291150 A) discloses a vehicle body in which various reinforcements are implemented in order to increase the rigidity of a floor panel or another such flat panel.

In the vehicle body structure disclosed in JP 07-291150 A, the floor panel is reinforced by a bead that is long and thin in the longitudinal direction of the vehicle body, a bead that is long and thin in the width direction of the vehicle, and a cross member that is long and thin in the width direction of the vehicle.

The bead (longitudinal bead) that is long and thin in the longitudinal direction of the vehicle body and the bead (transverse bead) that is long and thin in the width direction of the vehicle are formed so as to intersect with each other on the surface of the floor panel. The cross member is a member formed so as to be substantially U-shaped as seen from the side of the vehicle body, the cross member covers the top of the transverse bead, and the cross member is connected to the floor panel. As a result, the portion where the substantially U-shaped cross member and the floor panel are joined is formed into a closed cross section shape as seen from the side of the vehicle body.

However, in the vehicle body structure disclosed in JP 07-291150 A, the longitudinal bead is blocked by the transverse bead. Moreover, the cross member is connected to the floor panel alone, and is not connected to the longitudinal bead or the transverse bead. Therefore, there is a limit on how much of an increase can be achieved by means of the longitudinal bead, the transverse bead, and the cross member in the rigidity of the floor panel in the portions where the beads intersect with each other.

In the vehicle body structure disclosed in JP 07-291150 A, depending on the vehicle, there are cases in which various pipes pass through the inner sides of the longitudinal bead. In this case, the longitudinal bead must have a height sufficient to allow pipes to pass through, even in the portion that intersects with the cross member and the transverse bead. Therefore, the cross member and the transverse bead have portions cut out where the longitudinal bead passes through. Consequently, there is room for improvement in ensuring rigidity in the cross member and the transverse bead.

A possibility that has been considered is to divert portions upward in the cross member where the longitudinal bead passes through. However, the height of the cross member would increase in the diverted portions. Since the passenger compartment must be accommodating, there is a limit on how much the height from the floor panel to the top surface of the cross member can be increased. Moreover, it is inadvisable because the weight of the vehicle body increases proportionate to the diverted portions.

In view of this, there is a demand for a technique whereby it is possible to increase the rigidity of the portions where reinforcing members intersect with each other, as well as the rigidity of the floor panel in the intersecting portions.

SUMMARY OF THE INVENTION

According to the present invention, there is provided a vehicle body structure, comprising: a panel; a first set of reinforcing members and a second set of reinforcing members which intersect with each other; and a connecting member; wherein both sets of reinforcing members are provided on a surface of the panel; and the connecting member is disposed at an intersecting portion where both sets of reinforcing members intersect with each other, and is connected to both sets of reinforcing members.

Therefore, both of the reinforcing members (pair of reinforcing members) are connected to each other by the connecting members in the intersecting portions where the reinforcing members intersect with each other. Consequently, the rigidity of the intersecting portion between the reinforcing members can be increased, and the rigidity of the panel in the intersecting portion can be increased. Moreover, since the configuration involves merely connecting the pair of reinforcing members together by means of the connecting member in the intersecting portion, the weight of the vehicle body does not substantially increase. In other words, it is possible to increase the rigidity of the intersecting portion between the reinforcing members while suppressing weight increases in the vehicle body.

It is preferred that the first set of reinforcing members comprises a first reinforcing member and a second reinforcing member divided from each other in the longitudinal direction of the first set of reinforcing members. The first and second reinforcing members have member vertical walls that extend in the longitudinal direction of the first and second reinforcing members and that rise from a surface of the panel. An end of the second reinforcing member is positioned so as to face an end of the first reinforcing member across a predetermined space in the intersecting portion. The second set of reinforcing members comprises a third reinforcing member and a fourth reinforcing member divided from each other in the longitudinal direction of the second set of reinforcing members. The third and fourth reinforcing members have member vertical walls that extend in the longitudinal direction of the third and fourth reinforcing members and that rise from a surface of the panel. An end of the fourth reinforcing member is positioned so as to face an end of the third reinforcing member across the space in the intersecting portion. The connecting member has first vertical walls and second vertical walls that rise from a surface of the panel in a state in which the connecting member is connected to the ends of the first, second, third, and fourth reinforcing members. The first vertical walls are positioned in the space so as to connect to the vertical walls of the first and second reinforcing members. The second vertical walls are positioned in the space so as to connect to the vertical walls of the third and fourth reinforcing members.

Thus, the first, second, third, and fourth reinforcing members have a predetermined space in the portion where the reinforcing members intersect with each other, and a connecting member for connecting the ends of all the reinforcing members is disposed in this space. The reinforcing members have a plurality of vertical ribs disposed so that each of the ribs is substantially continuous with the vertical walls of the reinforcing members. Therefore, the first vertical wall of the connecting member is substantially continuous with the vertical walls of the first and second reinforcing members aligned with each other in a straight line. The second vertical wall of the connecting member is substantially continuous with the vertical walls of the third and fourth reinforcing members aligned with each other in a straight line. Therefore, it is possible to increase the rigidity of the intersecting portions between the reinforcing members, as well as the rigidity of the panels in the intersecting portion. Moreover, since the intersecting portion has a configuration merely in which the connecting member is disposed in the space which does not have reinforcing members, the weight of the vehicle body does not substantially increase. In other words, it is possible to increase rigidity while suppressing weight increases in the vehicle body. Thus, rigidity of the panels increases in the intersecting portion between the first, second, third, and fourth reinforcing members. The result is a higher quality ride within the vehicle. In cases in which collision energy acts on the vehicle, the collision energy can be sufficiently borne by the highly rigid first, second, third, and fourth reinforcing members.

It is also preferred that the first and second vertical walls comprise vertical plate-shaped ribs extending downward from the top ends of the connecting member.

It is also preferred that the heights of the ends of the first, second, third, and fourth reinforcing members in relation to the surface of the panel be substantially equal to each other.

It is preferred that the panel comprises a floor panel, the first set of reinforcing members comprises a long, thin floor bead that bulges upward from the floor panel and extends in the longitudinal direction of the vehicle body. The second set of reinforcing members comprises a cross member that extends in the vehicle width direction so as to intersect with and overlap the floor bead from above. The floor bead has an enclosing bead part in the portion intersecting with the cross member so that the height is less than the other portions which do not intersect. The cross member has an opening in bottom surface through which the enclosing bead part passes through. The connecting member is formed so as to be substantially cross shaped as seen from the panel surface of the floor panel so as to enable connecting of the intersecting portion in the state in which the floor bead and the cross member intersect.

Thus, an enclosing bead part is formed in the floor bead in the portion that intersects with the cross member. The enclosing bead part is set to a height that allows pipes to pass through, for example. The cross member has an opening in the bottom surface through which the enclosing bead part passes through. The floor bead and the cross member can be disposed so as to intersect by superimposing the opening over the enclosing bead part. Since the enclosing bead part passes through the opening, the height from the floor panel to the cross member does not increase. Therefore, the passenger compartment can be ensured to be accommodating. Furthermore, the floor bead and the cross member are connected by the connecting member having a cross shape as seen from the panel surface, in a state in which the floor bead and cross member intersect with each other. The result is that regardless of whether or not the enclosing bead part passes through the opening, the rigidity of the intersecting portion between the floor bead and the cross member can be increased. Moreover, the configuration is simple, merely provided with a connecting member having a cross shape as seen from the panel surface, and the weight of the vehicle body does not substantially increase. In other words, it is possible to increase the rigidity of the vehicle body while suppressing weight increases in the vehicle body. Thus, the rigidity of the floor panel is increased in the intersecting portion between the floor bead and the cross member. The result is a higher quality ride within the vehicle. In cases in which collision energy acts on the vehicle, the collision energy can be sufficiently borne by the highly rigid floor bead and cross member.

It is also preferred that the floor bead comprises a first reinforcing member and a second reinforcing member that are aligned along a straight line via the enclosing bead part in the intersecting portion; the cross member comprises a third reinforcing member and a fourth reinforcing member that are aligned along a straight line in the intersecting portion via a portion having the opening; and the connecting member be connected to the first, second, third, and fourth reinforcing members.

It is also preferred that the height from the top surface of the floor panel to the top surface of the cross member be substantially equal to the height from the top surface of the floor panel to the top surfaces of the floor bead.

It is also preferred that the opening be set to a shape and size that allow the enclosing bead part to fit and be connected with substantially no gaps.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

First, the vehicle body structure of the first embodiment will be described with reference to FIGS. 1 through 7.

Figure 1:
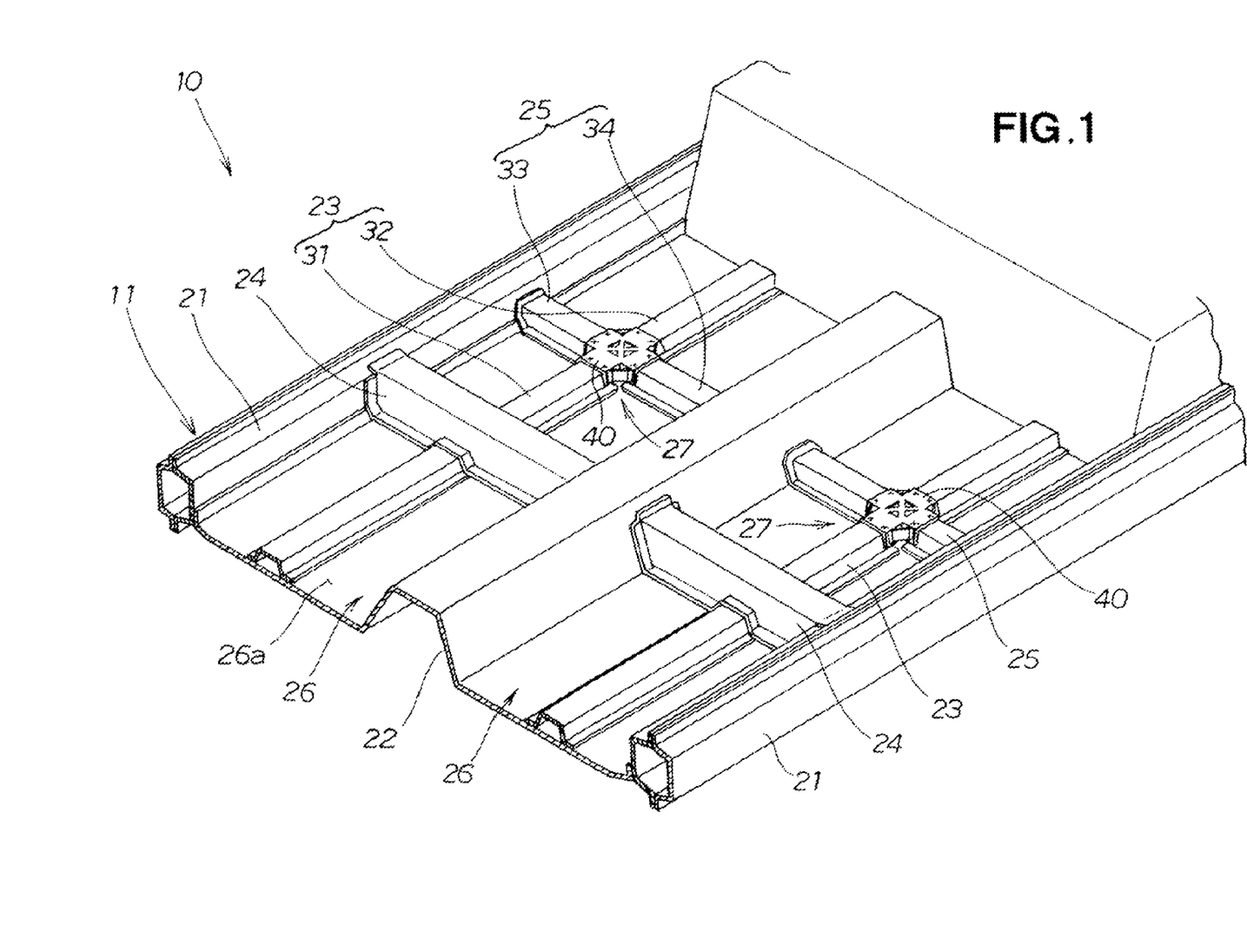
FIG. 1 is a perspective view of a vehicle body according to the first embodiment of the present invention.

A vehicle body 11 in an automobile or another vehicle 10 comprises a monocoque body, as shown in FIG. 1. The configuration of the center portion of the vehicle body 11 (passenger compartment portion) has left and right side sills 21, 21, a floor tunnel 22, left and right floor frames 23, 23, two front and rear cross members 24, 25, and front floor panels 26, 26.

The left and right side sills 21, 21 are members that are positioned on the left and right sides of the vehicle body 11 and that extend in the longitudinal direction of the vehicle body 11. The floor tunnel 22 is a member that is positioned in the center of the vehicle width and that extends in the longitudinal direction of the vehicle body 11. The left and right floor frames 23, 23 are members that are positioned to the left and right sides of the floor tunnel 22 and that extend in the longitudinal direction of the vehicle body 11. The front and rear cross members 24, 25 are members that extend in the vehicle width direction and that span between the side sills 21 and the floor tunnel 22. The front floor panels 26, 26 are flat plates that spread between the side sills 21 and the floor tunnel 22, and comprise steel sheets formed by bending.

When the vehicle body 11 is viewed from above, the front and rear cross members 24, 25 both intersect with the floor frames 23. Therefore, the intersecting portions 27 between the floor frames 23 and the cross members 25 are substantially cross-shaped as seen in a plan view.

The floor frames 23 and the cross members 24, 25 are disposed along top surfaces 26a (first set of surfaces 26a) of the front floor panel 26 and are connected (welded) to the front floor panels 26. The result is that the top surfaces 26a of the front floor panels 26 are reinforced by the floor frames 23 and the cross members 24, 25. The floor frames 23 and the front cross members 24 constitute a pair of reinforcing members. The floor frames 23 and the rear cross members 25 also constitute a pair of reinforcing members. The floor frames 23 and the rear cross members 25 are connected by connecting members 40 at the points of mutual intersection, which are the intersecting portions 27.

Next, the connecting structure of the floor frames 23 and the rear cross members 25 will be described.

Figure 2:
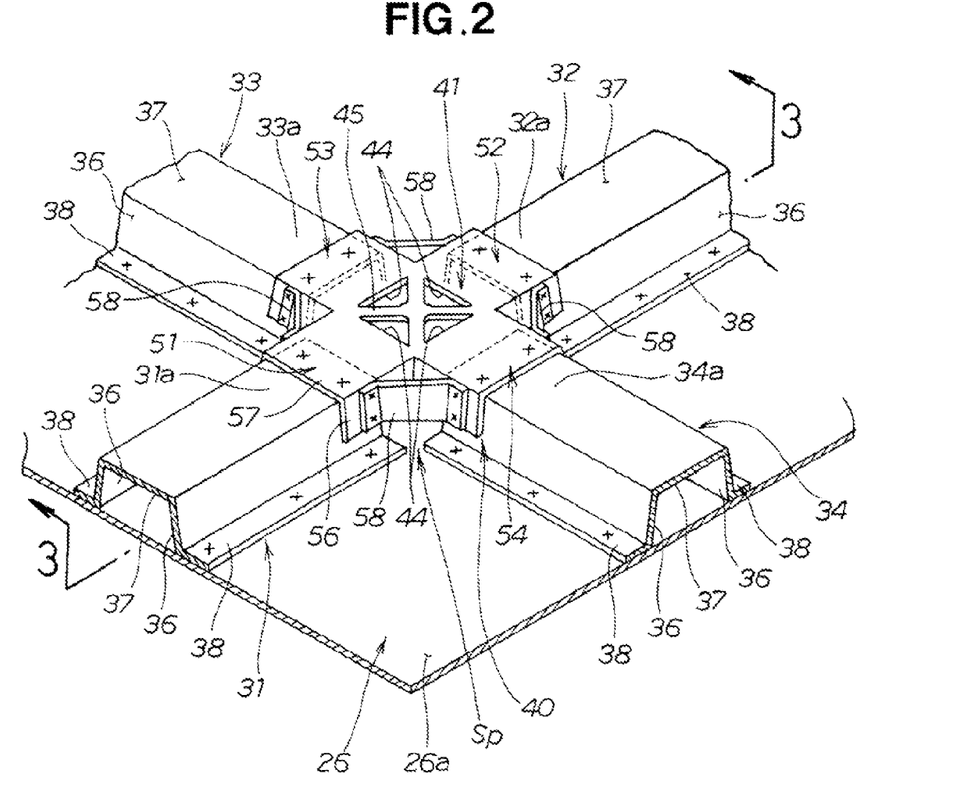
FIG. 2 is a perspective view of a connecting portion between a floor frame and a cross member shown in FIG. 1.

The floor frames 23 comprise first reinforcing members 31 and second reinforcing members 32, which are divided in the longitudinal direction of the floor frames 23, as shown in FIGS. 1 and 2. The rear cross members 25 comprise third reinforcing members 33 and fourth reinforcing members 34, which are divided from each other in the longitudinal direction of the rear cross members 25. The first, second, third, and fourth reinforcing members 31 through 34 are positioned along the top surfaces 26a of the front floor panels 26 and are connected together, and are thereby capable of reinforcing the front floor panels 26.

The first and second reinforcing members 31, 32 are aligned along a straight line so that a first set of ends 31a, 32a face each other across a predetermined space Sp. The third and fourth reinforcing members 33, 34 are aligned along a straight line so that a first set of ends 33a, 34a face each other across the same space Sp. Furthermore, the third and fourth reinforcing members 33, 34 are disposed in directions that intersect with the first and second reinforcing members 31, 32. In other words, when the vehicle body 11 is viewed from above, the third and fourth reinforcing members 33, 34 are disposed in cross shapes in relation to the first and second reinforcing members 31, 32. Thus, the first, second, third, and fourth reinforcing members 31 through 34 are positioned so that the first set of ends 31a, 32a, 33a, 34a face each other across the space Sp in the intersecting portions 27 (see FIG. 1).

All of the reinforcing members 31 through 34 are steel sheets formed by bending so as to be a substantially U shaped as seen in a cross section from the longitudinal direction of the reinforcing members 31 through 34, as seen in FIGS. 2 through 5. The reinforcing members 31 through 34 all comprise left and right vertical walls 36, 36, top plates 37, and left and right flanges 38, 38. The left and right vertical walls 36, 36 are vertical plate-shaped members that extend in the longitudinal direction of the reinforcing members 31 through 34 and that rise from the top surfaces 26a of the front floor panels 26. The top plates 37 are lateral plate-shaped portions that span between the top ends of the left and right vertical walls 36, 36. The left and right flanges 38, 38 are portions that extend to the sides from the bottom ends of the left and right vertical walls 36, 36, and are connected to the top surfaces 26a of the front floor panels 26. The heights of the set of ends 31a through 34a in all of the reinforcing members 31 through 34 in relation to the top surfaces 26a of the front floor panels 26 are substantially equal to each other.

The connecting members 40 for connecting the ends 31a through 34a of all of the reinforcing members 31 through 34 together are disposed in the spaces Sp, as shown in FIGS. 2 through 5. The connecting members 40 are formed into cross shapes in a plan view, and are steel articles for covering the ends 31a through 34a from the top plates 37 and for connecting the ends together, the connecting members 40 comprising bent articles or cast articles made of steel sheets, for example. To be more specific, each connecting member 40 comprises a central main element 41, a pair of first vertical walls 42, 42 to the left and right of the main element 41, a pair of second vertical walls 43, 43 to the front and rear of the main element 41, and four leg parts 51 through 54.

The main elements 41 comprise flat plates that are square-shaped in a plan view and that are positioned in the centers of the connecting members 40 in a plan view. The main elements 41 are provided so as to be substantially parallel to the top plates 37 of the reinforcing members 31 through 34. The first vertical walls 42, 42 and the second vertical walls 43, 43 are positioned on the four sides of the main elements 41. The four leg parts 51 through 54 are members that extend to the front, rear, left, and right from the four sides in the main elements 41 in a plan view. The leg parts 51 through 54 are configured as having substantially inverted U-shaped cross sections as seen from the direction in which they extend, and comprise left and right vertical walls 56, 56 and top plates 57. The left and right vertical walls 56, 56 are vertical plate-shaped portions that rise from the top surfaces 26a of the front floor panels 26 when connected to the ends 31a, 32a, 33a, 34a of the reinforcing members 31 through 34. The top plates 57 are lateral plate-shaped portions that span between the top ends of the left and right vertical walls 56, 56. The top plates 57 are formed as flat plate shapes that lie in the same planes or substantially the same planes as the flat plate-shaped main elements 41.

The four leg parts 51 through 54 include first leg parts 51, second leg parts 52, third leg parts 53, and fourth leg parts 54. The first leg parts 51 are portions in which the ends 31a of the first reinforcing members 31 are fitted and connected. The second leg parts 52 are portions in which the ends 32a of the second reinforcing members 32 are fitted and connected. The third leg parts 53 are portions in which the ends 33a of the third reinforcing members 33 are fitted and connected. The fourth leg parts 54 are portions in which the ends 34a of the fourth reinforcing members 34 are fitted and connected. The main elements 41, the first leg parts 51, and the second leg parts 52 are aligned in a straight line. The main elements 41, the third leg parts 53, and the fourth leg parts 54 are aligned in a straight line.

The vertical walls 56, 56 in the mutually adjacent first and third leg parts 51, 53, in the third and second leg parts 53, 52, in the second and fourth leg parts 52, 54, and in the fourth and first leg parts 54, 51, are connected together by vertical plate-shaped stays 58. The stays 58 may be formed integrally with the leg parts 51 through 54.

The first vertical walls 42, 42 and the second vertical walls 43, 43 are vertical plate-shaped portions that rise from the top surfaces 26a of the front floor panels 26 when the connecting members 40 are in a state of being connected to the ends 31a, 32a, 33a, 34a of the reinforcing members 31 through 34. The first vertical walls 42, 42 and the second vertical walls 43, 43 comprise vertical plate-shaped ribs extending downward from the top ends of the connecting members 40 in the four sides of the main elements 41.

Figure 5:
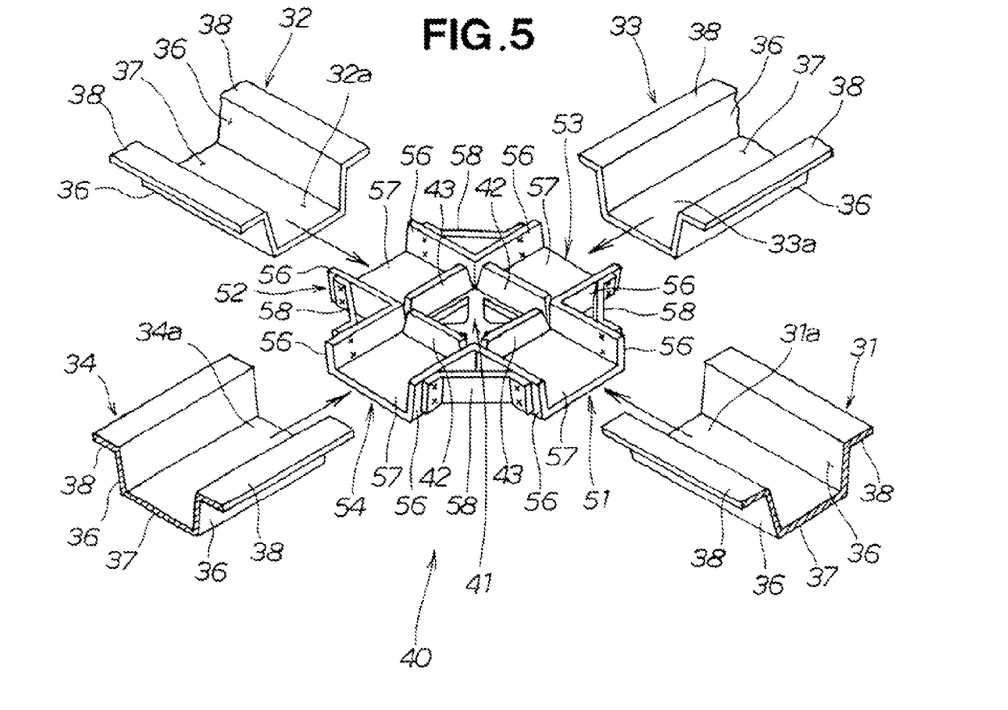
FIG. 5 is an exploded view of the connecting portion between the floor frame and the cross member shown in FIG. 4.

Each pair of first vertical ribs 42, 42 is disposed so as to be individually continuous with the left and right vertical walls 56, 56 in the first and second leg parts 51, 52 (disposed along the same lines of extension as the left and right vertical walls 56, 56), as shown in FIG. 5. Each pair of second vertical ribs 43, 43 are disposed so as to be individually continuous with the left and right vertical walls 56, 56 in the third and fourth leg parts 53, 54 (disposed along the same lines of extension as the left and right vertical walls 56, 56).

The first vertical ribs 42, 42 can have a configuration of being disposed so as to be continuous with the vertical walls 56, 56 of the first and second leg parts 51, 52, including a configuration of being separated by small spaces as shown in FIG. 5, or a configuration of being integrally formed without any spaces. Similarly, the second vertical ribs 43, 43 can have a configuration of being disposed so as to be continuous with the vertical walls 56, 56 of the third and fourth leg parts 53, 54.

Figure 4:
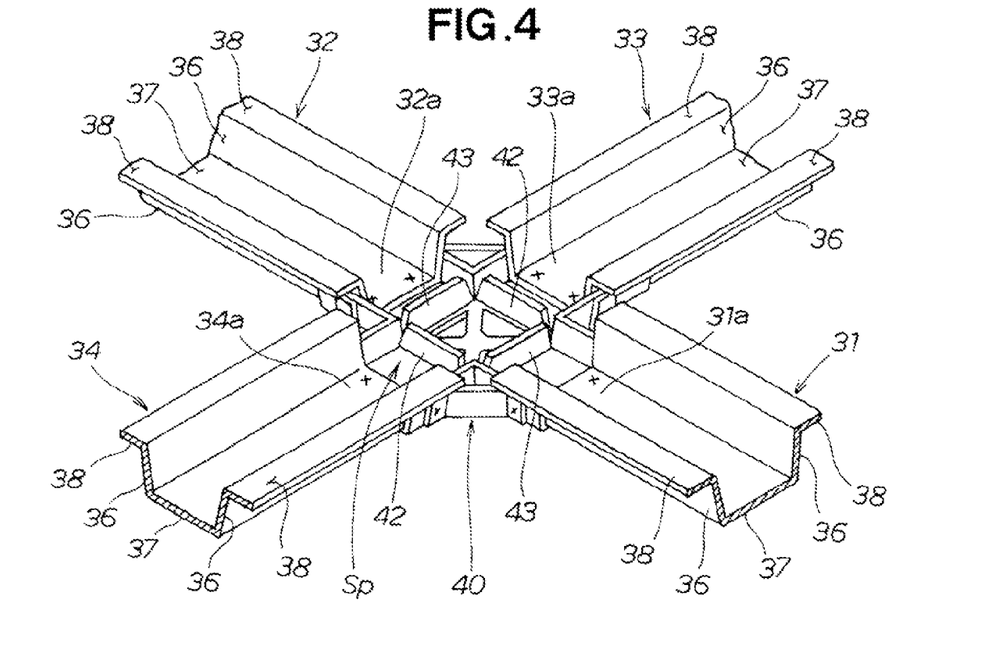
FIG. 4 is a perspective view as seen from below the connecting portion between the floor frame and the cross member shown in FIG. 2.

As a result of the above, when the connecting members 40 are in a state of being connected to the reinforcing members 31 through 34, the first vertical walls 42, 42 are positioned so as to be continuous with the vertical walls 36, 36 of the first and second reinforcing members 31, 32 within the spaces Sp, as shown in FIGS. 4 and 5. The second vertical walls 43, 43 are positioned so as to be continuous with the vertical walls 36, 36 of the third and fourth reinforcing members 33, 34 within the spaces Sp.

Figure 3:
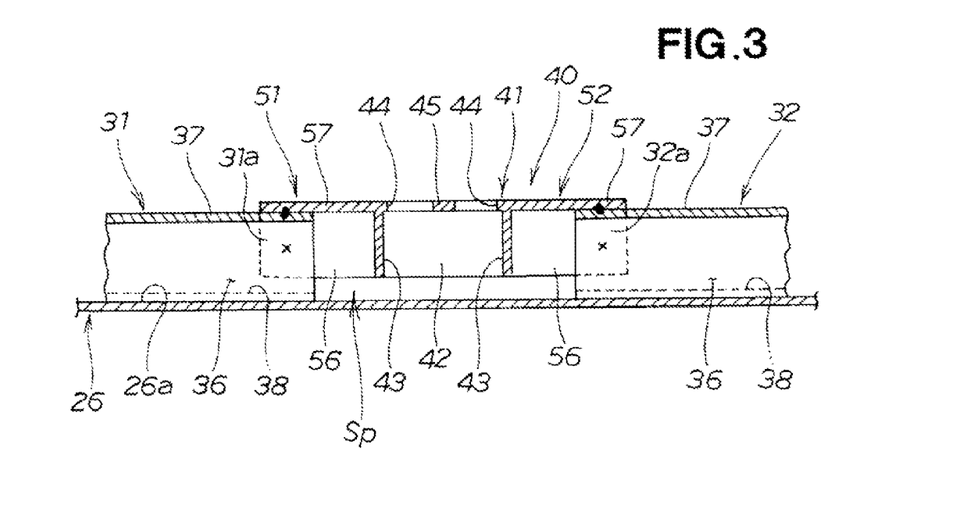
FIG. 3 is a cross-sectional view taken along line 3-3 of FIG. 2.

The main elements 41 have four through holes 44 running through in the plate thickness direction, as shown in FIGS. 2 and 3. The four through holes 44 are formed into substantially equilateral triangle shapes in order to reduce the weight of the connecting members 40, the through holes being disposed so that the bottom sides of the triangles face the leg parts 51 through 54, and the apexes of all the triangles face each other. Therefore, connecting parts 45 are formed between the through holes 44 adjacent to each other in the main elements 41. The connecting parts 45 are formed into X shapes when the main elements 41 are viewed from above.

The X-shaped connecting parts 45 fulfill a so-called "bracing" role of diagonally joining the four leg parts 51 through 54. For example, in cases in which torsional force acts on one of the four reinforcing members 31 through 34, the torsional force is transferred from the associated leg part to the remaining other leg parts via the connecting parts 45. Therefore, the torsional force acting on the first reinforcing members 31, for example, is efficiently transferred to the second reinforcing members 32 via the connecting parts 45. The result is that when torsional deformation occurs in the first reinforcing members 31, the second reinforcing members 32 can also undergo torsional deformation in continuation with the first reinforcing members 31.

Thus, the connecting members 40 can be reduced in weight by providing four through holes 44 to the main elements 41. Moreover, loads can be transferred with extreme efficiency between the first and second reinforcing members 31, 32 via the connecting parts 45. In other words, the first and second reinforcing members 31, 32, which are separated from each other, are integrated by the connecting members 40. The same applies to the third and fourth reinforcing members 33, 34.

As is made clear from the above description, according to the present embodiment, the vertical walls 56, 56 of the first and second leg parts 51, 52 and the first vertical ribs 42, 42 in the connecting members 40 are substantially continuous with the vertical walls 36, 36 of the first and second reinforcing members 31, 32 aligned with each other along a straight line. The vertical walls 56, 56 of the third and fourth leg parts 53, 54 and the second vertical ribs 43, 43 in the connecting members 40 are also substantially continuous with the vertical walls 36, 36 of the third and fourth reinforcing members 33, 34 aligned with each other along a straight line. Therefore, it is possible to increase the rigidity of the intersecting portions 27 (see FIG. 1) between the reinforcing members 31 through 34, as well as the rigidity of the front floor panels 26 in the intersecting portions 27. Moreover, because of a configuration in the intersecting portions 27 in which only the connecting members 40 are disposed in the spaces Sp having no reinforcing members, the weight of the vehicle body 11 does not substantially increase. In other words, it is possible to increase rigidity while suppressing an increase in the weight of the vehicle body 11.

Figure 6:
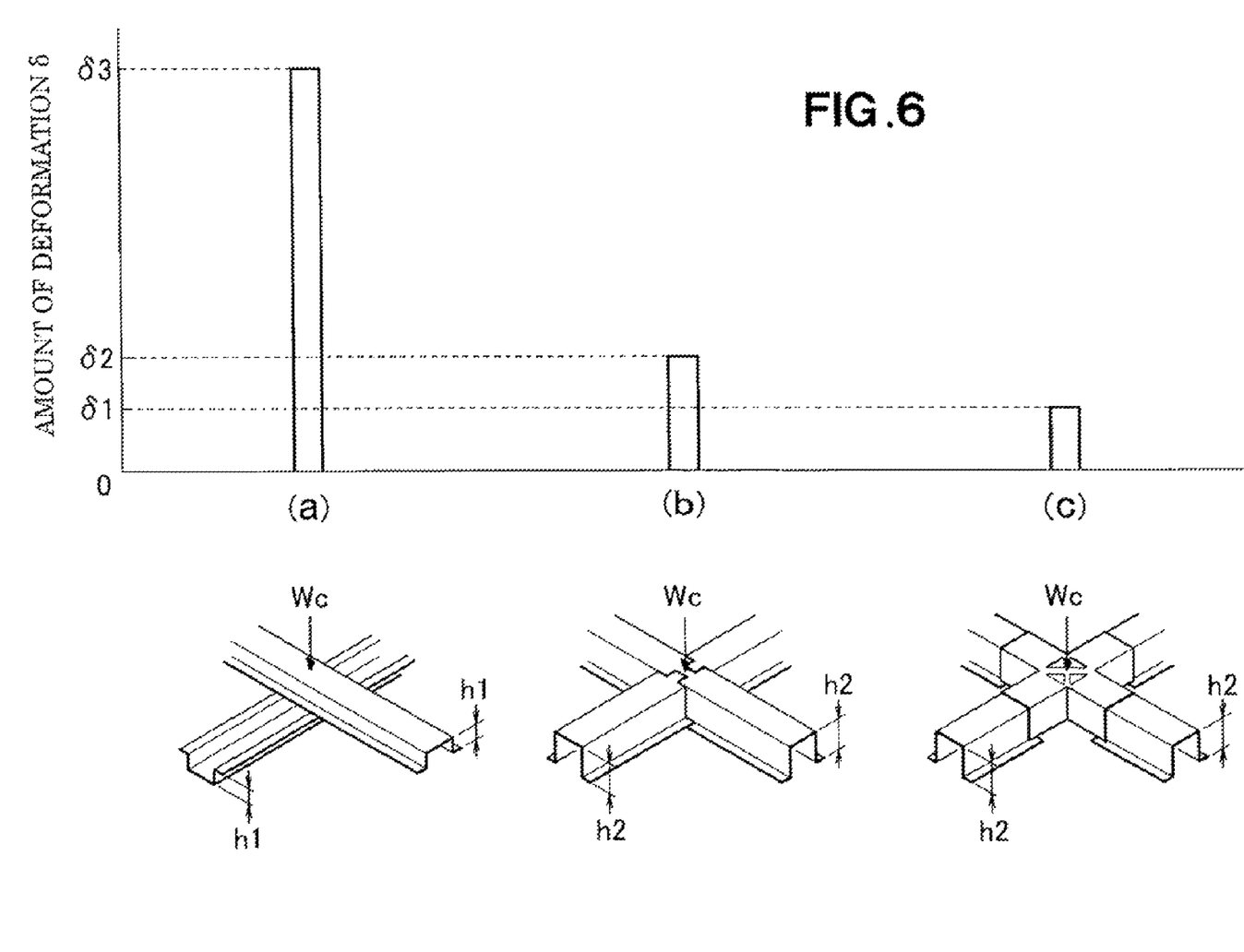
FIG. 6 is a diagrammatical view comparing amounts of deformation in assembled structures of various reinforcing members.

FIG. 6 is an explanatory diagram comparing the amounts of deformation in various structures of assembled reinforcing members, wherein the horizontal axis represents the various structures of assembled reinforcing members, and the vertical axis represents the amounts of deformation $\delta$ in the assembled structures. The following (a) through (c) depict the results of measuring the amounts of deformation (amounts of flexion) $\delta$ whereby the reinforcing members flexibly deform when the reinforcing members are supported at both ends and a perpendicular load Wc acts from above on the point where the reinforcing members intersect. The reinforcing members all have the same cross-sectional shapes, materials, lengths, widths, and plate thickness.

The first configuration shown in (a) is a configuration in which a pair of reinforcing members are overlaid so as to intersect. The height of the reinforcing members is h1. In this configuration, the amount of deformation when the perpendicular load Wc is applied is $\delta 3$ and is comparatively large.

The second configuration shown in (b) is a configuration in which a pair of reinforcing members is made to protrude through each other so as to intersect. The height h2 of the reinforcing members is twice the height h1 shown in (a). In this configuration, the amount of deformation when the perpendicular load Wc is applied is $\delta 2$, and is much less than the amount of deformation $\delta 3$ in the first configuration shown in (a).

The third configuration shown in (c) corresponds to the first embodiment shown in FIGS. 2 through 5. The height h2 of the reinforcing members is the same as in (b). In this configuration, the amount of deformation when the perpendicular load Wc is $\delta 1$, and is even less than the amount of deformation $\delta 2$ in the second configuration shown in (b). It can be seen from the above results that the configuration shown in FIGS. 2 through 5 is effective in suppressing weight increases and increasing the rigidity of the reinforcing members.

Figure 7:
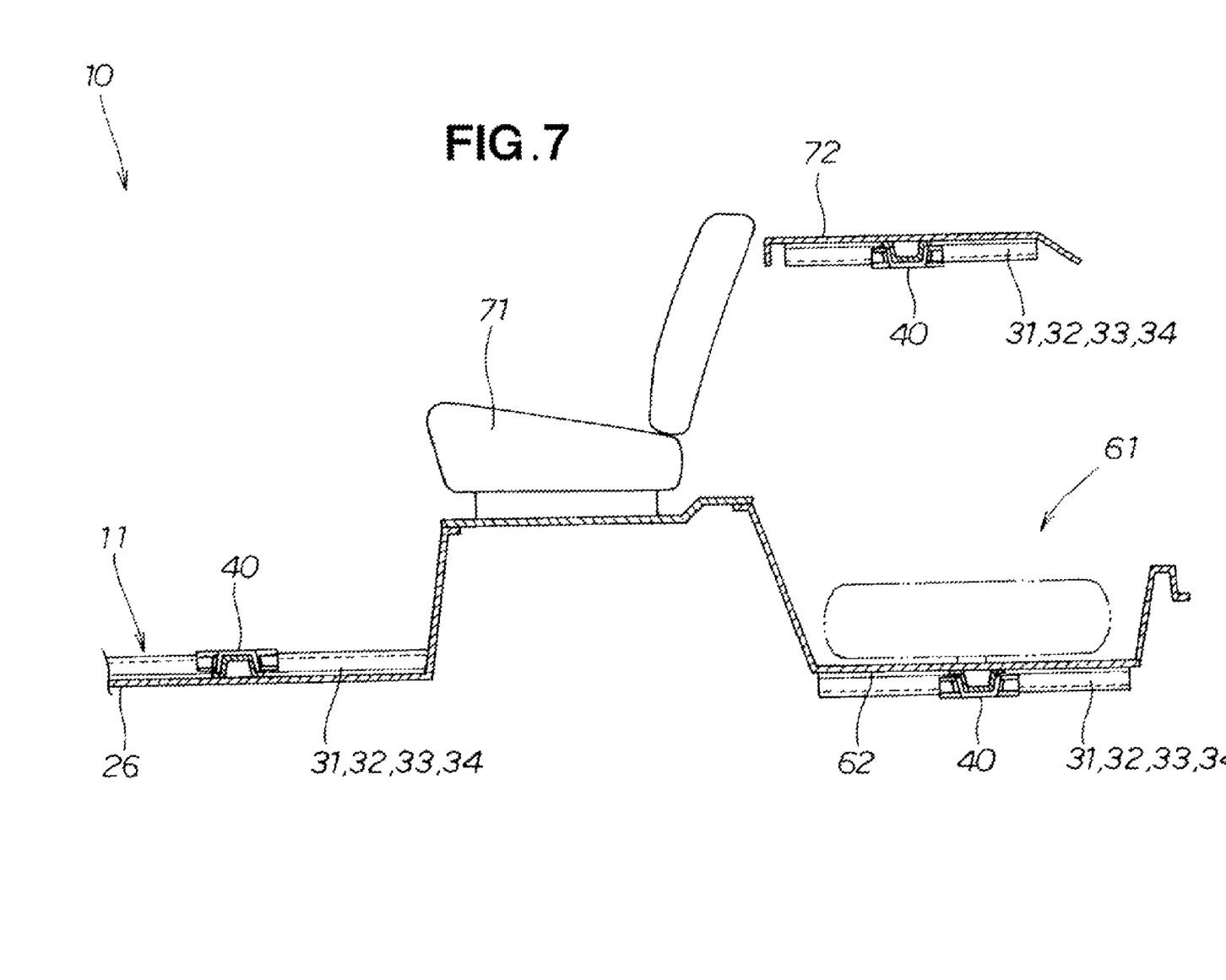
FIG. 7 is a schematic view showing an application example in which the connecting member of FIG. 1 is applied to various parts of the vehicle body.

The configuration shown in FIGS. 1 through 5, in which the four reinforcing members 31 through 34 are connected by the connecting members 40, can be applied to other areas of the vehicle body 11 as shown in FIG. 7. FIG. 7 shows an application example in which the connecting members 40 shown in FIG. 1 are applied to other parts of the vehicle body 11.

The first application example is a configuration of a cargo space 61 located in the rear of the vehicle 10, wherein four reinforcing members 31 through 34 are aligned to reinforce the bottom surface of a rear floor panel 62 of the vehicle body 11, and the reinforcing members 31 through 34 are connected by connecting members 40. According to the first application example, the cargo space 61 can be ensured to be sufficiently spacious, and the rear floor panel 62 can be configured to be lightweight and highly rigid.

The second application example is a configuration wherein four reinforcing members 31 through 34 are aligned to reinforce the bottom surface of a rear parcel panel 72 (also known as a rear parcel shelf) disposed behind a rear seat 71, and the reinforcing members 31 through 34 are connected by connecting members 40. According to the second application example, the rear parcel panel 72 can be configured to be lightweight and highly rigid. In the second application example, for the sake of weight reduction, the reinforcing members 31 through 34 are preferably configured by beads formed on the rear parcel panel 72.

The following is a description of a modification example of the connected portions of the first through fourth reinforcing members 31 through 34 in the vehicle body structure of the first embodiment. Components identical to those of the first embodiment shown in FIGS. 1 through 5 are denoted by the same numerical symbols and are not described.

Figure 8:
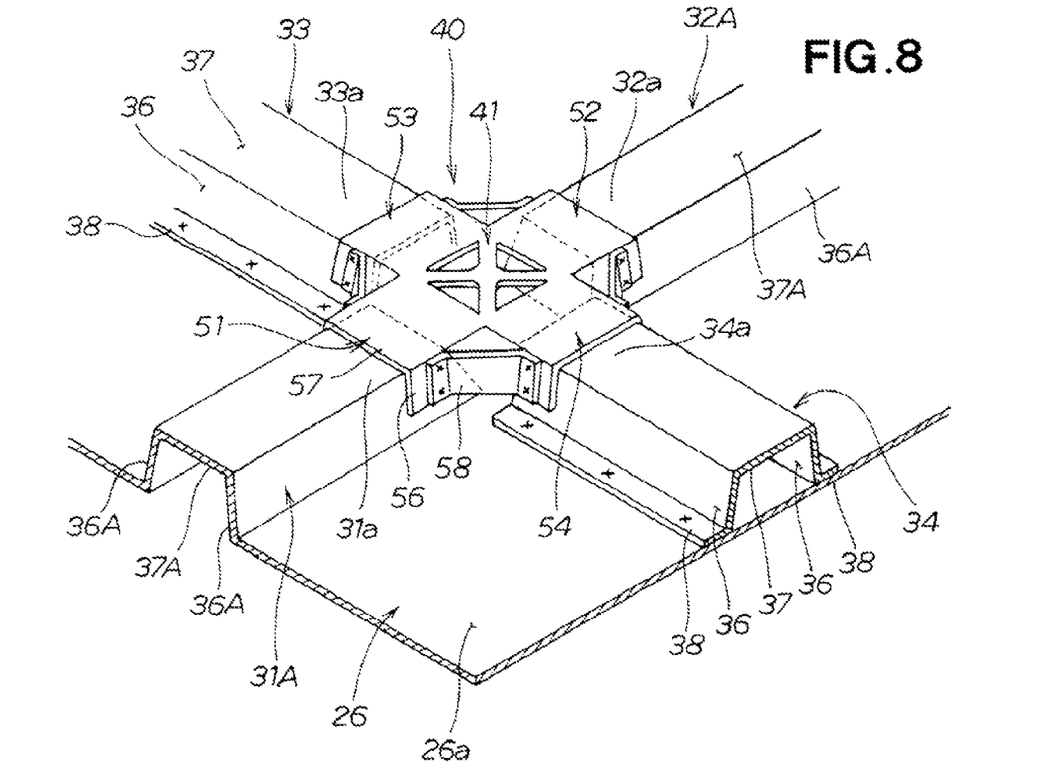
FIG. 8 is a perspective view of a modification of the connecting portion between the floor frame and the cross member shown in FIG. 2.

First, the vehicle body structure of the first modification will be described. In the vehicle body structure of the first modification as shown in FIG. 8, first and second reinforcing members 31A, 32A are configured by beads formed on the top surfaces 26a of the front floor panels 26. The beads are formed on the front floor panels 26 by embossing or another method so as to extend upward from the top surfaces 26a, and the beads have groove-shaped configurations as seen from the bottom surfaces of the front floor panels 26.

The first and second reinforcing members 31A, 32A of the first modification correspond to the first and second reinforcing members 31, 32 shown in FIG. 2 above. In other words, the first and second reinforcing members 31A, 32A of the first modification comprise left and right vertical walls 36A, 36A that rise from the top surfaces 26a of the front floor panels 26, and top plates 37A that span between the top ends of the left and right vertical walls 36A, 36A. Thus, since at least one of the four reinforcing members 31 through 34 (see FIG. 2) is configured by beads 31A, 32A, the weight of the vehicle 10 is reduced proportionately.

Figure 9:
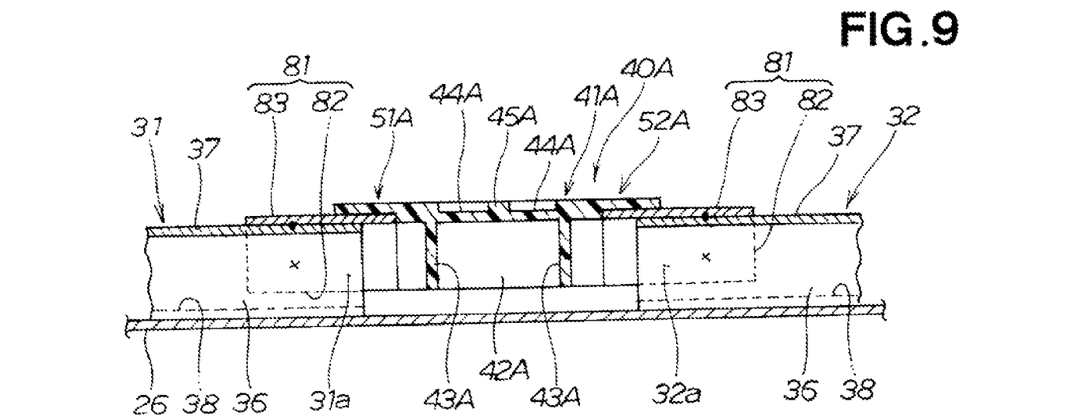
FIG. 9 is a cross-sectional view of a modification example of the connecting portion between the floor frame and cross member shown in FIG. 3.

Next, the vehicle body structure of the second modification will be described. FIG. 9 shows the vehicle body structure of the second modification in correlation with FIG. 3 above. In the vehicle body structure of the second modification, the connecting member 40 comprises a resin-molded article as shown in FIG. 9. The connecting member 40A is a member that corresponds to the connecting members 40 shown in FIGS. 2 through 5, and the connecting member 40A has four leg parts 51A through 54A (only 51A and 52A are shown in FIG. 9). The four leg parts 51A through 54A correspond to the four leg parts 51 through 54 shown in FIGS. 2 through 5.

The connecting member 40A is a member in which elongated members 81 comprising steel or another metal are integrally formed at the distal end portions of the four leg parts 51A through 54A. The elongated members 81 comprise left and right vertical walls 82, 82 and top plates 83 that span between the top ends of the left and right vertical walls 82, 82, so as to allow the reinforcing members 31 through 34 to be fitted in. In the connecting member 40A of the second modification, a main element 41A, first and second vertical ribs 42A, 43A, concave parts 44A, and a connecting part 45A correspond to the first and second vertical ribs 42, 43, the through holes 44, and the connecting parts 45 shown in FIGS. 2 through 5 above. The concave parts 44A are not vertical through holes, but are formed by concave and convex shapes (embossed shapes) as shown in FIG. 9, thereby reducing the weight of the connecting member 40A.

Next, the vehicle body structure of the second embodiment will be described with reference to FIGS. 10 through 14.

Figure 10:
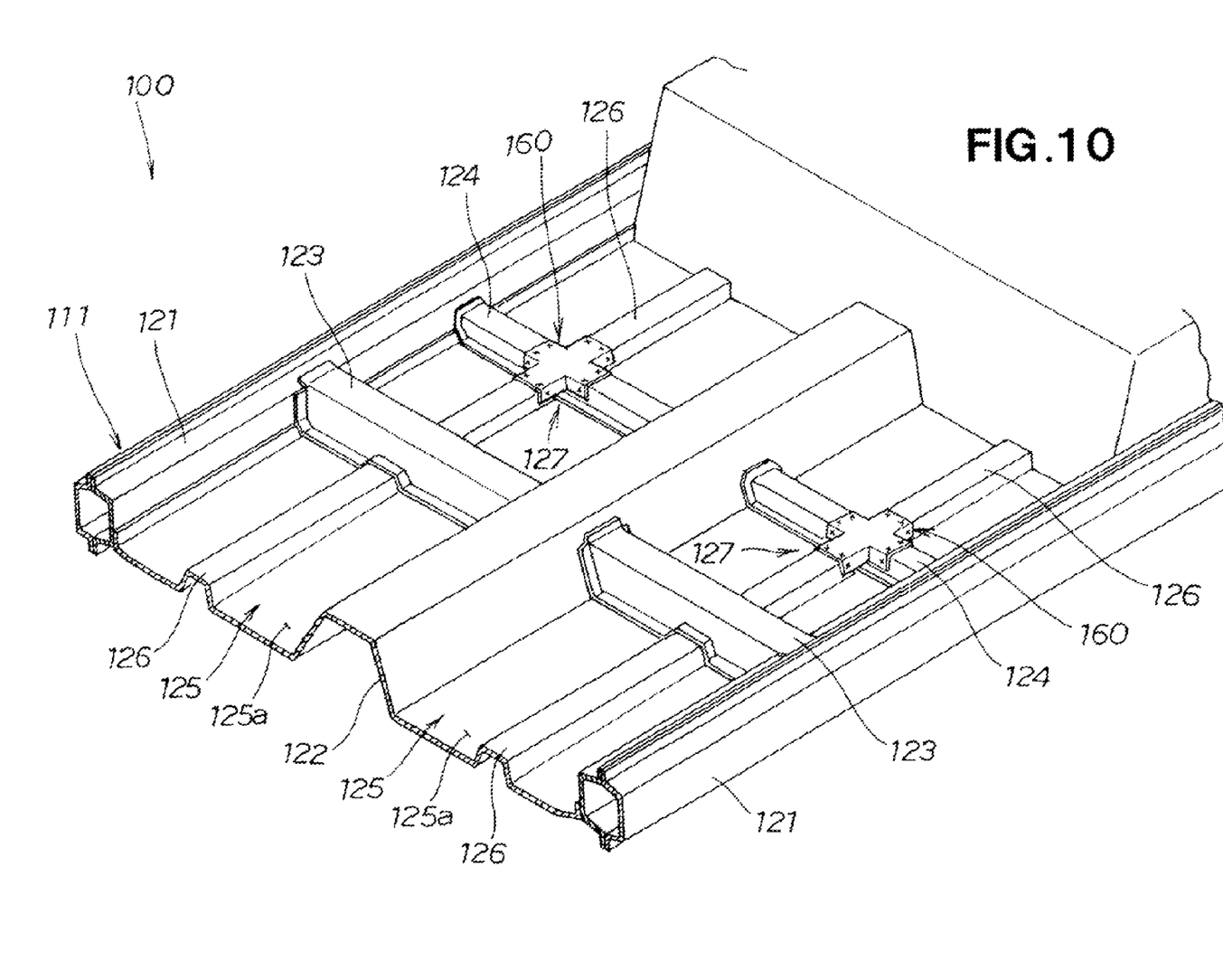
FIG. 10 is a perspective view of a vehicle body according to a second embodiment of the present invention.

A vehicle body 111 in an automobile or another vehicle 100 comprises a monocoque body, as shown in FIG. 10. The configuration of the center portion of the vehicle body 111 (passenger compartment portion) comprises left and right side sills 121, 121, a floor tunnel 122, two front and rear cross members 123, 124, front floor panels 125, 125, and left and right floor beads 126, 126.

The left and right side sills 121, 121 are members that are positioned on the left and right sides of the vehicle body 111 and that extend in the longitudinal direction of the vehicle body 111. The floor tunnel 122 is a member that is positioned in the center of the vehicle width and that extends in the longitudinal direction of the vehicle body 111. The front and rear cross members 123, 124 are members that extend in the vehicle width direction and that span between the side sills 121 and the floor tunnel 122. The front floor panels 125, 125 are flat plates that spread between the side sills 121 and the floor tunnel 122, and comprise steel sheets formed by bending.

The front cross members 123 and floor beads 126 constitute a pair of reinforcing members. The rear cross members 124 and floor beads 126 also constitute a pair of reinforcing members. The floor beads 126 intersect with both the front and rear cross members 123, 124 as seen from above the vehicle body 111. Therefore, the intersecting portions between the cross members 123, 124 and the floor beads 126 are substantially cross shaped in a plan view. The intersecting portions 127 where the rear cross members 124 and floor beads 126 intersect with each other are connected (welded) by connecting members 160.

The front and rear cross members 123, 124 are disposed along top surfaces 125a (first set of surfaces 125a) of the front floor panels 125, and are connected (welded) to the front floor panels 125. The result is that the top surfaces 125a of the front floor panels 125 are reinforced by the cross members 123, 124.

The rear cross members 124 are formed by bending steel sheets so as to have a substantially inverted U shape in cross section, as seen from the longitudinal direction of the cross members 124, as shown in FIGS. 11 through 14. The cross members 124 comprise left and right vertical walls 131, 131, top plates 132, and left and right flanges 133, 133. The left and right vertical walls 131, 131 are vertical plate-shaped members that extend in the longitudinal direction of the cross members 124 and that rise from the top surfaces 125a of the front floor panels 125. The top plates 132 are lateral plate-shaped portions that span between the top ends of the left and right vertical walls 131, 131. The left and right flanges 133, 133 are portions that extend to the sides from the bottom ends of the left and right vertical walls 131, 131, and are connected to the top surfaces 125a of the front floor panels 125.

The left and right floor beads 126, 126 are positioned to the left and right sides of the floor tunnel 122, and the floor beads extend in the longitudinal direction of the vehicle body 111, as shown in FIG. 10. The floor beads 126 are configured by long, thin beads that bulge upward from the top surfaces 125a of the front floor panels 125 and that extend in the longitudinal direction of the vehicle body 111, as shown in FIGS. 11 through 14. These types of floor beads 126, 126, are formed in the front floor panels 125 by embossing or another method of machining so that the beads bulge upward from the top surfaces 125a. The floor beads 126, 126 are formed into groove shapes as can be seen from the underside of the front floor panels 125.

As is made clear from the above description, the floor beads 126 are portions that are disposed along the top surfaces 125a of the front floor panels 125, thereby reinforcing the front floor panels 125. In other words, the floor beads 126 are used instead of reinforcing members comprising separate members.

To give a more specific description, the floor beads 126 are formed into a substantially inverted U shapes in cross section, as seen when viewing the floor beads 126 from the longitudinal direction. The floor beads 126 comprise left and right vertical walls 141, 141 and top plates 142. The left and right vertical walls 141, 141 are vertical plate-shaped portions that extend in the longitudinal direction of the floor beads 126 and that rise from the top surfaces 125a of the front floor panels 125. The top plates 142 are lateral plate-shaped portions that span between the top ends of the left and right vertical walls 141, 141.

Next, the connecting structure of the rear cross members 124 and the floor beads 126 will be described with reference to FIGS. 11 through 14.

The floor beads 126 have enclosing bead parts 143 in the portions 127 that intersect with the cross members 124. The enclosing bead parts 143 are portions formed into enclosing shapes so as to be lower in height than the other portions 144, 145. Since the enclosing bead parts 143 and the other portions 144, 145 differ in height, the top plates 142, 143a are joined together by inclined top plates 146.

The overall heights H1, H2 of the floor beads 126 have the following relationship to the top surfaces 125a of the front floor panels 125. The height H1 of the enclosing bead parts 143 (height H1 of the top plates 143a) intersecting with the cross members 124 is less than the height H2 of the other portions 144, 145 (height H2 of the top plates 142), which do not intersect.

Figure 11:
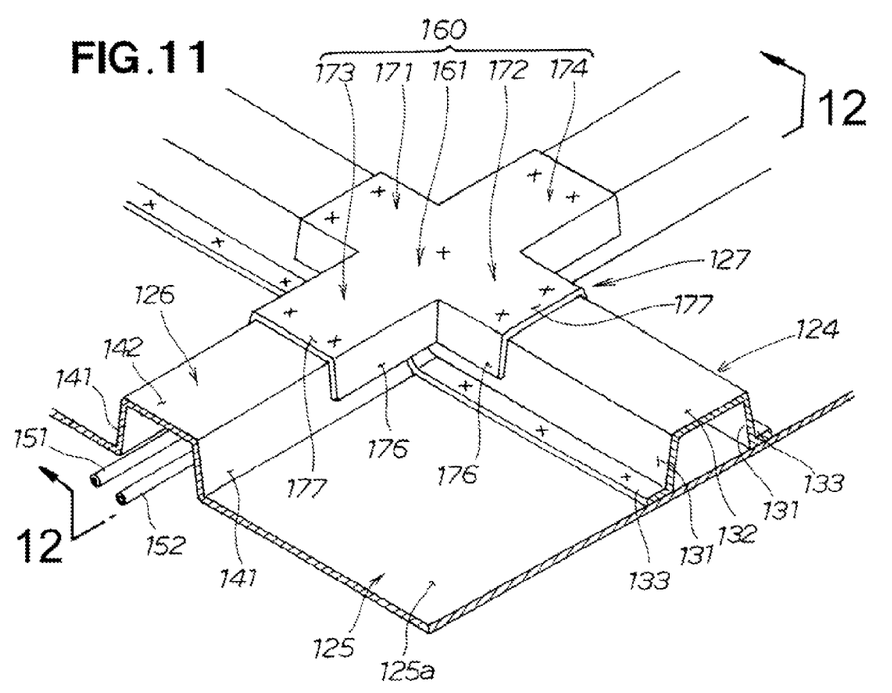
FIG. 11 is a perspective view of the connecting portion of a connecting member between a floor bead and a cross member shown in FIG. 10.
Figure 12:
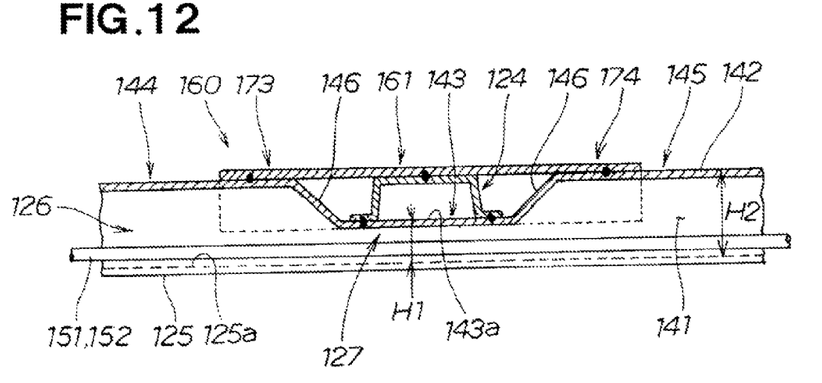
FIG. 12 is a cross-sectional view taken along line 12-12 of FIG. 11.

Various pipes 151, 152 extending in the longitudinal direction of the vehicle body run through the insides of the floor beads 126, as shown in FIGS. 11 and 12. A height H1 sufficient to allow the pipes 151, 152 to pass through must be ensured in the floor beads 126, even in the portions 127 (enclosing bead parts 143) that intersect with the cross members 124. Therefore, the height H1 of the enclosing bead parts 143 is set to a height that allows the pipes 151, 152 to pass through.

Figure 13:
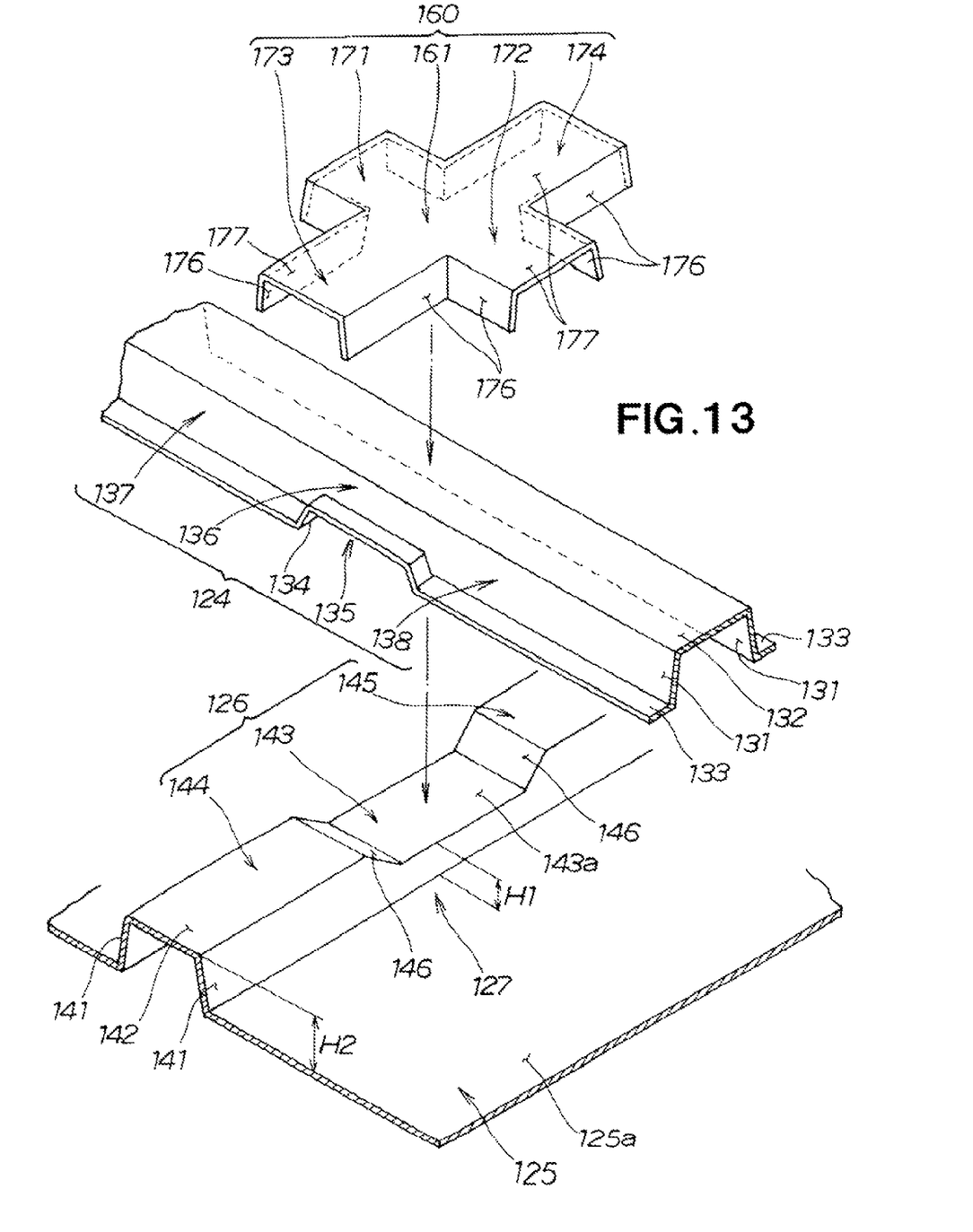
FIG. 13 is an exploded view of the connecting member between the floor bead and the cross member shown in FIG. 11.
Figure 14:
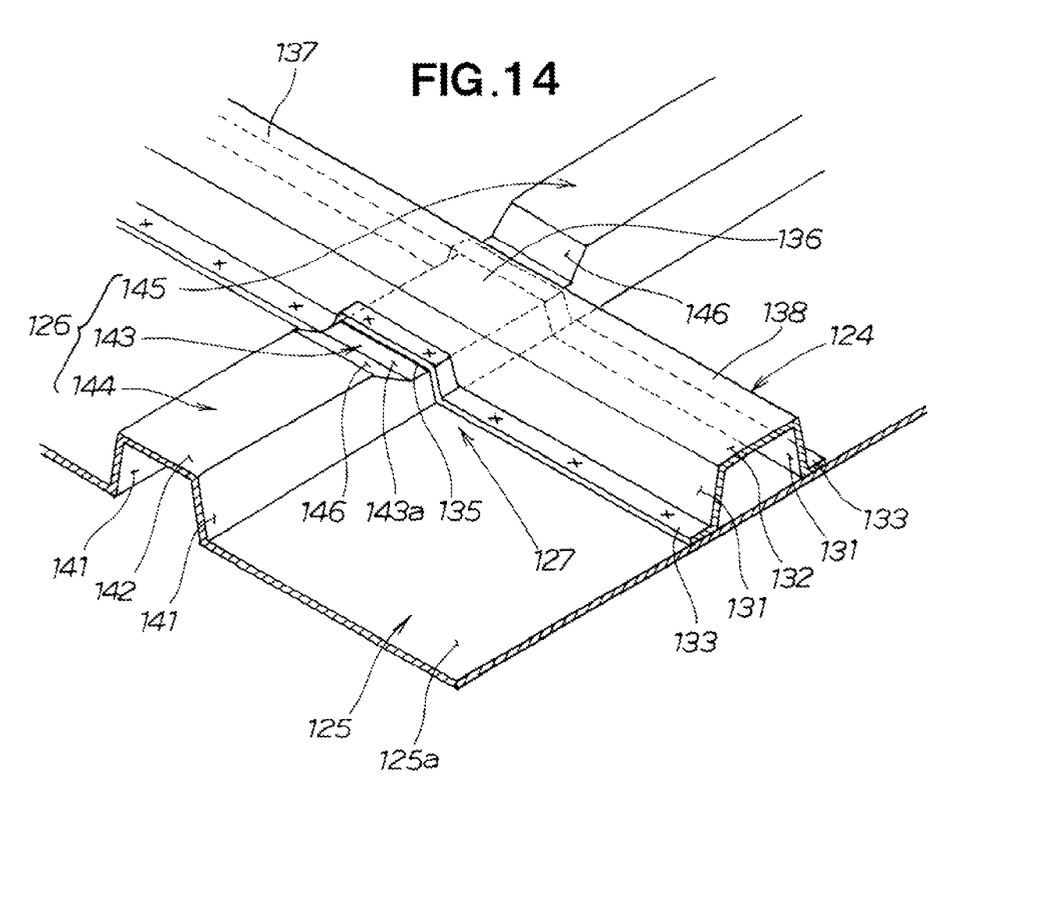
FIG. 14 is a perspective view of the floor bead and cross member in a state in which the connecting member shown in FIG. 11 has been removed.

The cross members 124 extend in the vehicle width direction so as to intersect and overlap the floor beads 126, and the cross members 124 have openings 135 through which the enclosing bead parts 143 pass, as shown in FIG. 13. The openings 135 are set to shapes and sizes that allow the enclosing bead parts 143 to fit in with no substantial gaps. The left and right flanges 133, 133 in the cross members 124 are formed so as to be capable of covering and connecting with the peripheries of the enclosing bead parts 143 when the openings 135 are fitted with the enclosing bead parts 143.

The floor beads 126 comprise first reinforcing members 144 and second reinforcing members 145, which are aligned along a straight line via the enclosing bead parts 143 in the intersecting portions 127, as shown in FIG. 13. The cross members 124 comprise third reinforcing members 137 and fourth reinforcing members 138, which are aligned along a straight line in the intersecting portions 127 so as to face each other via the portions 136 that have the openings 135.

The cross members 124 and the floor beads 126 are connected by the connecting members 160 when in the state of intersecting with each other, as shown in FIGS. 11 through 13. The connecting members 160 are connected to the first and second reinforcing members 144, 145, and to the third and fourth reinforcing members 137, 138.

To give a more specific description, the connecting members 160 are steel articles that are formed into cross shapes as seen from the top surfaces 125a (panel surfaces 125a) of the front floor panels 125, that cover the reinforcing members 144, 145, 137, 138 from the top plates 142, 132, and that are used for connecting; the connecting members 160 comprising bent articles or cast articles made of steel sheets, for example. The connecting members 160 comprise central main bodies 161, and four leg parts 171 through 174 that extend in four directions from the main bodies 161.

The main bodies 161 comprise flat plates that are square-shaped in a plan view, the plates being positioned in the centers of the connecting members 160 in a plan view. The main bodies 161 are provided so as to be substantially parallel to the top plates 142 of the first and second reinforcing members 144, 145, and substantially parallel to the top plates 132 of the third and fourth reinforcing members 136, 137.

The four leg parts 171 through 174 are configured as having substantially inverted U-shaped cross sections as seen from the direction in which they extend, and comprise left and right vertical walls 176, 176 and top plates 177. The left and right vertical walls 176, 176 are vertical plate-shaped portions that rise from the top surfaces 125a of the front floor panels 125 when connected to the reinforcing members 31 through 34. The top plates 177 are lateral plate-shaped portions that span between the top ends of the left and right vertical walls 176, 176. The top plates 177 are formed as flat plate shapes that lie in the same planes or substantially the same planes as the flat plate-shaped main bodies 161.

The four leg parts 171 through 174 include first leg parts 171, second leg parts 172, third leg parts 173, and fourth leg parts 174. The first leg parts 171 are portions in which the ends of the third reinforcing members 137 are fitted and connected. The second leg parts 172 are portions in which the ends of the fourth reinforcing members 138 are fitted and connected. The third leg parts 173 are portions in which the ends of the first reinforcing members 144 are fitted and connected. The fourth leg parts 174 are portions in which the ends of the second reinforcing members 145 are fitted and connected. The main bodies 161, the first leg parts 171, and the second leg parts 172 are aligned in a straight line. The main bodies 161, the third leg parts 173, and the fourth leg parts 174 are aligned in a straight line.

As is made clear from the above description, according to the second embodiment, the portions in the floor beads 126 that intersect with the cross members 124 are formed into enclosing bead parts 143. The enclosing bead parts 143 are set to a height H1 that allows the pipes 151, 152 to pass through. The cross members 124 have openings 135 in the bottom surfaces 134, wherein the enclosing bead parts 143 pass through the openings. By overlaying and connecting the openings 135 to the enclosing bead parts 143, the cross members 124 and the floor beads 126 can be disposed so as to intersect. Since the enclosing bead parts 143 pass through the openings 135, the height from the front floor panels 125 to the top surfaces of the cross members 124 (the top surfaces of the top plates 132) does not rise. Therefore, the passenger compartment can be ensured to be accommodating.

Furthermore, the cross members 124 and the floor beads 126 are connected by the connecting members 160 having cross shapes in a plan view while the cross members 124 and floor beads 126 are in a state of intersecting with each other. The result is that regardless of whether or not the enclosing bead parts 143 pass through the openings 135, the rigidity of the intersecting portions 127 between the cross members 124 and the floor beads 126 can be increased. Moreover, the configuration is simple, merely provided with connecting members 160 having cross shapes in a plan view, and the weight of the vehicle body 111 is essentially not increased. In other words, it is possible to increase the rigidity of the vehicle body 11 while suppressing weight increase in the vehicle body 111.

Thus, in the front floor panels 125, rigidity increases in the intersecting portions 127 between the cross members 124 and the floor beads 126. The result is a higher quality ride within the vehicle 100. In cases in which collision energy acts on the vehicle 100, the collision energy can be sufficiently borne by the highly rigid floor beads 126 and cross members 124.

In the present invention the material of the connecting members 40, 160 (see FIGS. 1 and 10) is not limited to steel or another such metal, and may be a resin such as the connecting member 40A of the second modification (see FIG. 9), for example. In this case, for example, the configuration may be designed so that resinous connecting members 40, 160 are connected to the reinforcing members 31 through 34, 137, 138, 144, and 145.

The vehicle body structure of the present invention is suitable for use in a vehicle body in a passenger vehicle or another vehicle.

Obviously, various minor changes and modifications of the present invention are possible in light of the above teaching. It is therefore to be understood that within the scope of the appended claims the invention may be practiced otherwise than as specifically described.

What is claimed is:

1. A vehicle body structure comprising:
a floor panel;
a first set of reinforcing members and a second set of reinforcing members which are arranged to intersect with each other; and
a connecting member,
wherein the first and second sets of reinforcing members are provided on a surface of the floor panel,
the connecting member is disposed at an intersecting portion where the first and second sets of reinforcing members meet, the connecting member being connected to the first and second sets of reinforcing members,
the first set of reinforcing members comprises a long, thin floor bead that bulges upward from the floor panel and extends in the longitudinal direction of the vehicle body,
the second set of reinforcing members comprises a cross member that extends in the vehicle width direction so as to intersect with and overlap the floor bead from above,
the floor bead has an enclosing bead part in the portion intersecting with the cross member so that the height is less than the other portions which do not intersect,
the cross member has an opening in a bottom surface through which the enclosing bead part passes through, and
the connecting member is formed so as to be substantially cross shaped as seen from the panel surface of the floor panel so as to enable connecting of the intersecting portion in a state in which the floor bead and the cross member intersect.

2. The vehicle body structure of claim 1, wherein the floor bead comprises a first reinforcing member and a second reinforcing member that are aligned along a straight line via the enclosing bead part in the intersecting portion,
the cross member comprises a third reinforcing member and a fourth reinforcing member that are aligned along a straight line in the intersecting portion via a portion having the opening, and
the connecting member is connected to the first, second, third, and fourth reinforcing members.

3. The vehicle body structure of claim 2, wherein the height from the top surface of the floor panel to the top surface of the cross member is substantially equal to the height from the top surface of the floor panel to the top surface of the floor bead.

4. The vehicle body structure of claim 1, wherein the opening is set to a shape and size that allow the enclosing bead part to fit and be connected with substantially no gaps.

* * * * *